United States Patent
Bulgrien et al.

(10) Patent No.: US 10,816,046 B2
(45) Date of Patent: Oct. 27, 2020

(54) CLUTCH CONTROL FOR SHARED POWER DISSIPATION

(71) Applicant: CNH Industrial America LLC, New Holland, PA (US)

(72) Inventors: Garth Harvey Bulgrien, Ephrata, PA (US); Alek Nicholas Czernobil, Lemont, IL (US)

(73) Assignee: CNH Industrial America LLC, New Holland, PA (US)

( * ) Notice: Subject to any disclaimer, the term of this patent is extended or adjusted under 35 U.S.C. 154(b) by 1047 days.

(21) Appl. No.: 15/236,822

(22) Filed: Aug. 15, 2016

(65) Prior Publication Data

US 2018/0045254 A1 Feb. 15, 2018

(51) Int. Cl.
F16D 48/06 (2006.01)

(52) U.S. Cl.
CPC .... *F16D 48/062* (2013.01); *F16D 2500/1026* (2013.01); *F16D 2500/10412* (2013.01); *F16D 2500/111* (2013.01); *F16D 2500/1112* (2013.01); *F16D 2500/30406* (2013.01); *F16D 2500/30412* (2013.01); *F16D 2500/30415* (2013.01); *F16D 2500/30421* (2013.01); *F16D 2500/50287* (2013.01); *F16D 2500/7027* (2013.01); *F16D 2500/70252* (2013.01); *F16D 2500/70408* (2013.01)

(58) Field of Classification Search
CPC ...................................................... B60K 1/02
USPC .......................................................... 701/67
See application file for complete search history.

(56) References Cited

U.S. PATENT DOCUMENTS

| | | | |
|---|---|---|---|
| 2,189,537 | A | 2/1940 | Swennes |
| 3,300,004 | A | 1/1967 | Peterson |
| 3,319,751 | A | 5/1967 | Sacchini |
| 3,362,511 | A | 1/1968 | Aschauer |
| 3,473,639 | A | 10/1969 | Becker et al. |
| 4,088,210 | A | 5/1978 | Hoff |
| 4,106,605 | A | 8/1978 | Winchell |
| 4,526,255 | A | 7/1985 | Hennessey et al. |
| 4,621,720 | A | 11/1986 | Zlotek |
| 4,681,199 | A | 7/1987 | Maucher et al. |
| 4,763,765 | A | 8/1988 | Black |
| 6,729,456 | B2 | 5/2004 | Beneton et al. |
| 6,991,585 | B2 * | 1/2006 | Colvin ............. F16D 48/066 477/174 |

(Continued)

FOREIGN PATENT DOCUMENTS

EP        0521270 B1      4/1995

OTHER PUBLICATIONS

Gustafsson, Filip, "Wet clutch load modeling for powershift transmission bench tests"; Jun. 9, 2014.

*Primary Examiner* — Charles A Fox
*Assistant Examiner* — Michael E Butler
(74) *Attorney, Agent, or Firm* — Rickard K. DeMille; Rebecca L. Henkel

(57) ABSTRACT

A method of controlling an input clutch and an output clutch, wherein the input clutch couples to a power source, the output clutch couples to a load, and the input clutch couples to the output clutch via gears, includes controlling torque of the input clutch based on a torque of the output clutch or a lookup table that controls the torque of the output clutch. The method also includes adjusting the torque of the input clutch based on a slip speed of the input clutch and a slip speed of the output clutch.

14 Claims, 6 Drawing Sheets

(56) References Cited

U.S. PATENT DOCUMENTS

| | | | | |
|---|---|---|---|---|
| 7,286,922 B1* | 10/2007 | Fischer | ................. | F16H 61/143 |
| | | | | 192/54.1 |
| 7,575,084 B2* | 8/2009 | Fujimoto | ............. | B60K 28/165 |
| | | | | 180/245 |
| 2008/0296123 A1 | 12/2008 | Vu et al. | | |
| 2010/0242224 A1 | 9/2010 | Maguire et al. | | |
| 2011/0238276 A1* | 9/2011 | Tsujimura | ............... | F16D 48/08 |
| | | | | 701/68 |
| 2013/0015034 A1 | 1/2013 | Boonpongmanee | | |
| 2013/0297122 A1* | 11/2013 | Gibson | ............... | B60W 10/026 |
| | | | | 701/22 |
| 2015/0353070 A1* | 12/2015 | Matsui | .................... | B60K 6/48 |
| | | | | 701/22 |
| 2016/0001764 A1* | 1/2016 | Iwase | ........................ | B60L 7/18 |
| | | | | 701/22 |
| 2016/0039405 A1* | 2/2016 | Terayama | ............. | B60W 30/02 |
| | | | | 701/22 |

\* cited by examiner

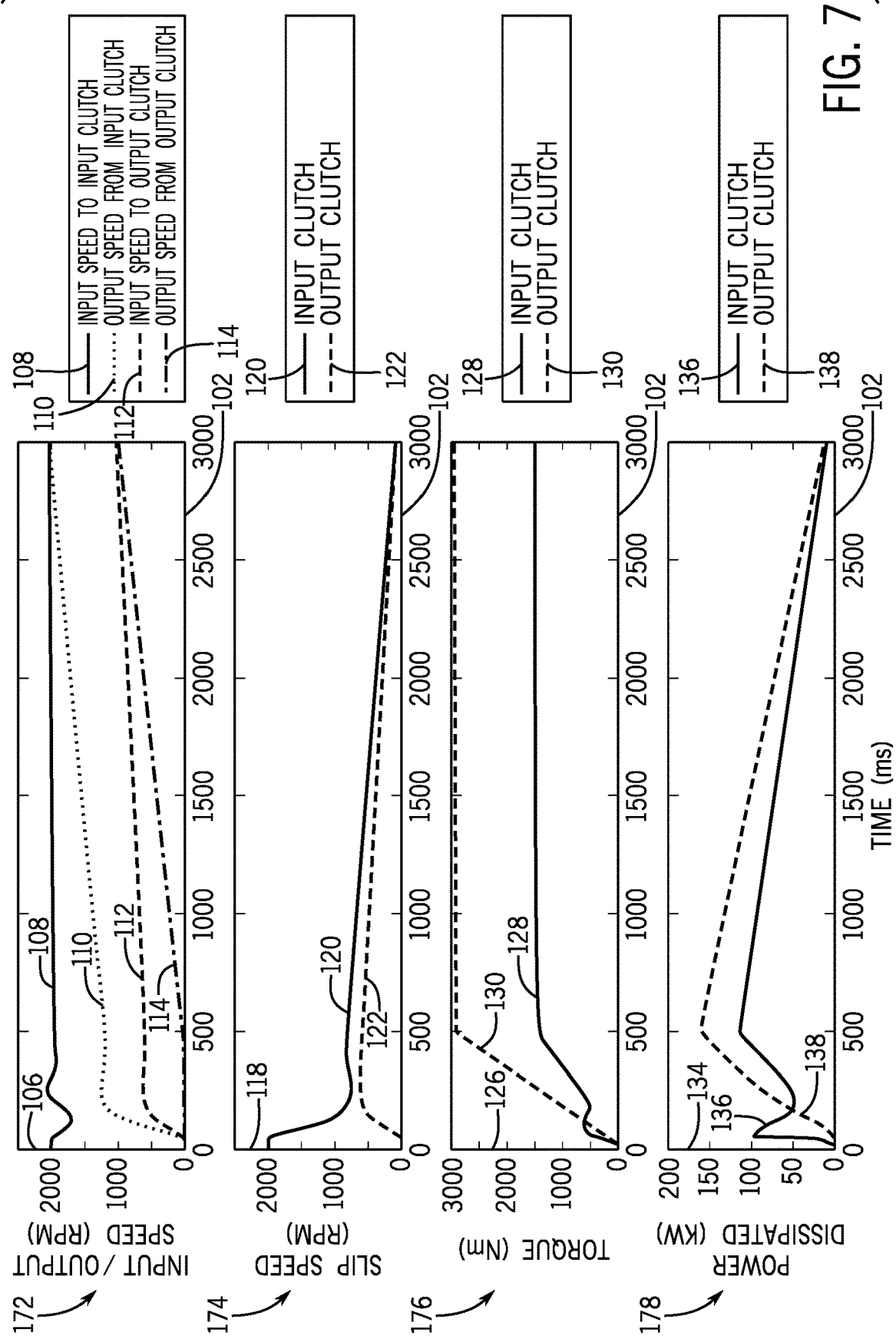

CLUTCH CONTROL FOR SHARED POWER DISSIPATION

BACKGROUND

The present disclosure relates generally to a clutch control for a transmission of a vehicle, such as an off-road vehicle or work vehicle (e.g., a tractor).

Typically, tractors with transmissions having discrete gears (i.e., tractors without continuously variable transmissions (CVTs)) utilize one or more clutches to engage certain gears for inching (i.e., short thrusts of motion at reduced power) and take-off (i.e., initiating movement from a stop). For such tractors, as a clutch engages, two or more elements of the clutch come into contact with one another. Initially, the two or more elements may slip and dissipate or absorb power. As the power of new tractor models increases, more power may be dissipated by the clutch. Accordingly, the clutch may include one or more friction plates with large surface areas such that the clutch may effectively dissipate the power. Increasing the size or number of the friction plate(s), and thus the size of the clutch, may result in a larger, more costly transmission package. A large clutch also tends to cause higher parasitic losses due to increased clutch drag.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a method of controlling an input clutch and an output clutch, wherein the input clutch couples to a power source, the output clutch couples to a load, and the input clutch couples to the output clutch via gears, includes controlling torque of the input clutch based on a torque of the output clutch or a lookup table that controls the torque of the output clutch. The method also includes adjusting the torque of the input clutch based on a slip speed of the input clutch and a slip speed of the output clutch.

In a second embodiment, a system of a work vehicle includes a transmission that includes an input clutch and an output clutch. The input clutch couples to a power source, the output clutch couples to a load, and the input clutch couples to the output clutch. The system also includes a controller communicatively coupled to the input clutch and to the output clutch. The controller controls torque of the input clutch based on a torque of the output clutch or a lookup table that controls the torque of the output clutch. The controller also adjusts the torque of the input clutch based on a slip speed of the input clutch and a slip speed of the output clutch.

In a third embodiment, a tangible, non-transitory, machine-readable medium includes machine-readable instructions to control torque of an input clutch based on a torque of an output clutch or a lookup table that controls the torque of the output clutch. The input clutch couples to a power source, the output clutch couples to a load, and the input clutch is coupled to the output clutch. The instructions also adjust the torque of the input clutch based on a slip speed of the input clutch and a slip speed of the output clutch.

DRAWINGS

These and other features, aspects, and advantages will become better understood when the following detailed description is read with reference to the accompanying drawings in which like characters represent like parts throughout the drawings, wherein.

Figure 6:
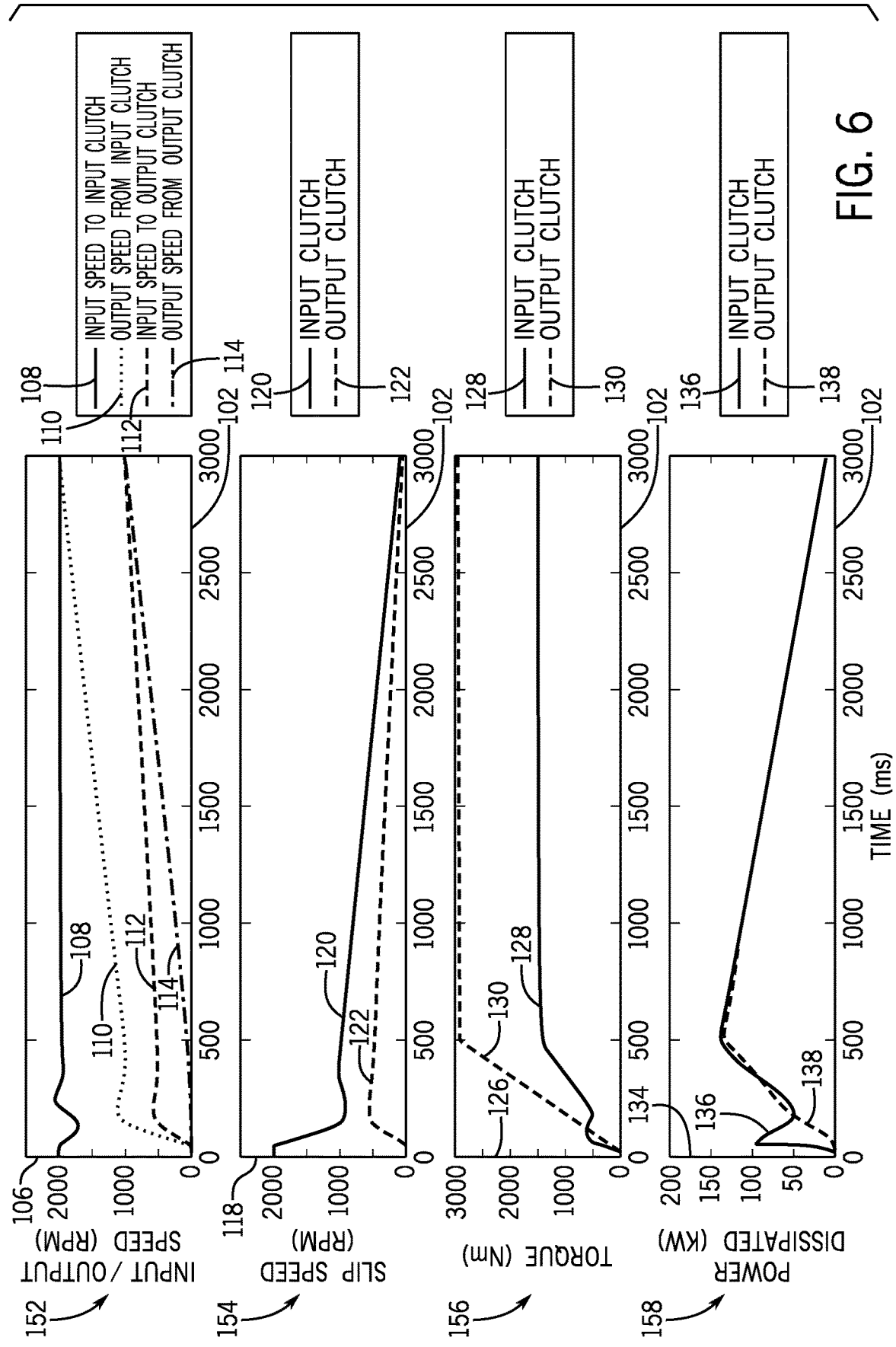

FIG. 6 is a set of graphs of parameters of an input clutch and an output clutch simulated in operation when a transmission having the input and output clutches is operated with a load, in accordance with an embodiment of the present disclosure; and FIG. 7 is another set of graphs of parameters of an input clutch and an output clutch simulated in operation when a transmission is operated with a load, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to a transmission control system for a transmission of a vehicle, such as a tractor. More particularly, systems and methods are disclosed herein, in which two clutches of the transmission are controlled by a transmission control system to reduce power dissipated by at least one of the clutches. Typically, tractors with transmissions having discrete gears (i.e., without continuously variable transmissions (CVTs)) utilize one or more clutches to engage certain gears for inching (i.e., short thrusts of motion at reduced power) and take-off (i.e., initiating movement from a stop), and the one or more clutches are part of a multi-clutch transmission of the tractor. For such a tractor, as a clutch engages, two or more elements of the clutch (e.g., at least one of the elements being a friction plate) come into contact with one another. Initially, the two or more elements may slip and dissipate power. Accordingly, certain tractor transmissions may employ a clutch that includes one or more friction plates with large surface area(s) such that the clutch may effectively dissipate the power. Increasing the size or number of the friction plate(s), and thus the size of the clutch, may result in a larger, more costly transmission package. A large clutch also tends to cause higher parasitic losses due to increased clutch drag.

Accordingly, the present disclosure relates to a technique in which two clutches of the transmission that are arranged in series along a torque path are used for inching and take-off, such that power dissipation may be shared by the two clutches. As a result, peak power dissipation of any single clutch may be reduced, as compared to using a single clutch. Advantageously, the two clutches may each be smaller than a single clutch used for inching and take-off. In using two clutches, methods and techniques may be used to apportion the power dissipated or absorbed between the two clutches. The torque transmitted by each of the two clutches may be controlled by controlling the pressure applied to each of the two clutches. In particular, the clutch pressures may be controlled so as to apportion the power dissipation by a desired ratio or percentage between the two clutches. Using two smaller clutches to dissipate power enables a size of the transmission to be reduced and/or a power capacity to be increased without increasing the size of the transmission.

Figure 1:
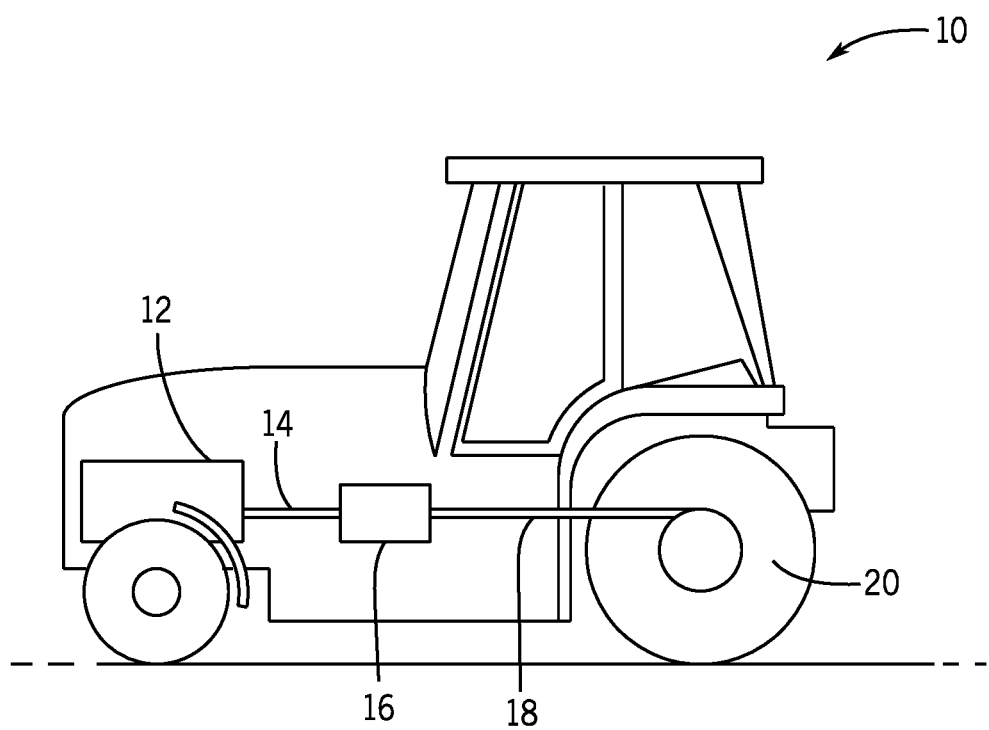
FIG. 1 is a diagram of a vehicle, in accordance with an embodiment of the present disclosure.

FIG. 1 is a diagram of a work vehicle 10 (e.g., a tractor) that includes a power source (e.g., an engine 12), a power input shaft 14, a transmission 16, and a power output shaft 18, in accordance with an embodiment of the present disclosure. The engine is coupled to the power input shaft 14 and may provide power to rotate the power input shaft 14. The transmission 16 is coupled to the power input shaft 14 and the power output shaft 18, such that the transmission 16 may transmit power from the power input shaft 14 to the power output shaft 18 (e.g., a vehicle drive shaft). The transmission 16 may be a geared transmission (as compared to a continuously variable transmission). The power output shaft 18 may power wheels 20 of the work vehicle 10.

Figure 2:
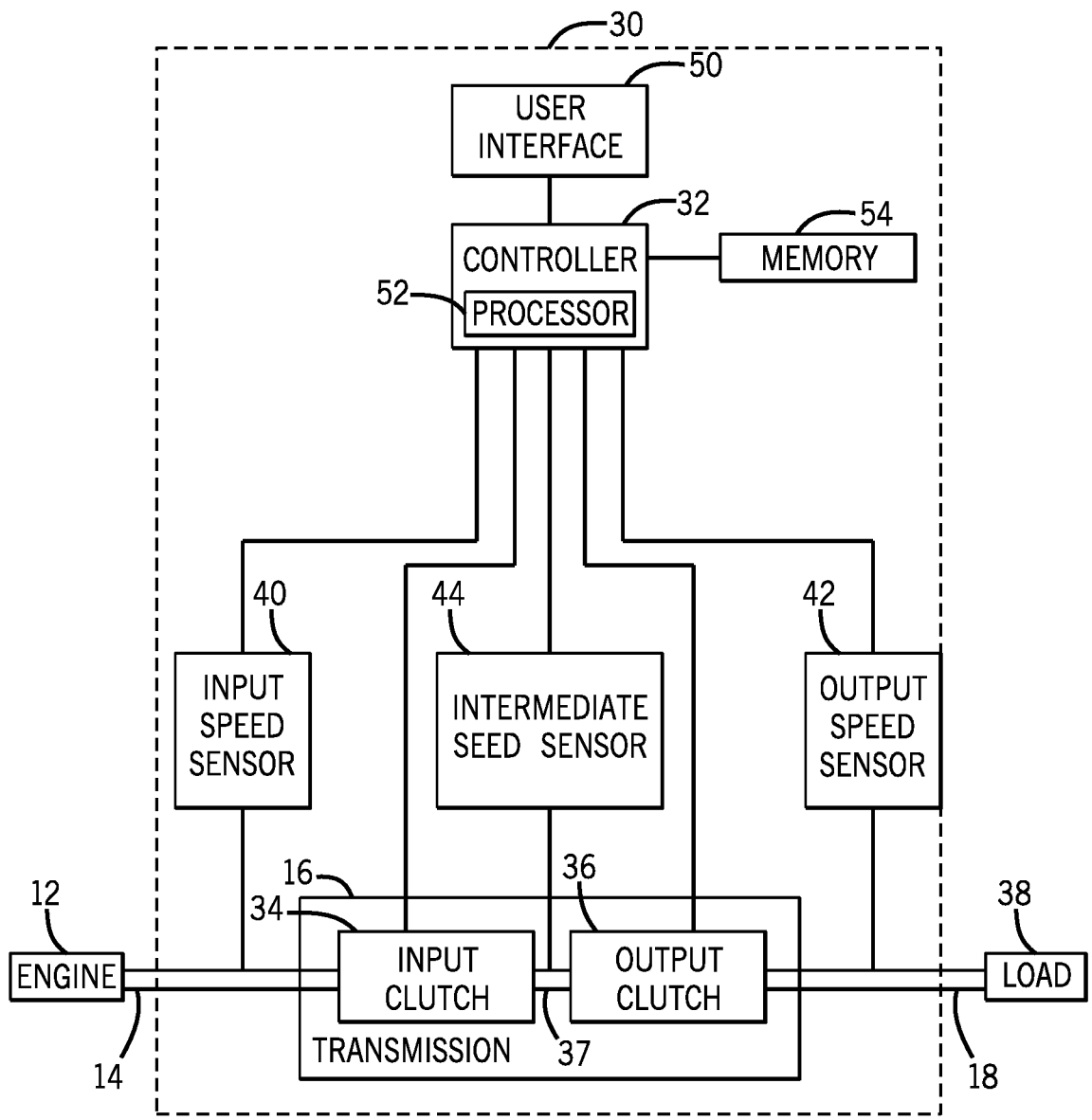
FIG. 2 is a block diagram of a transmission system that may be used in the vehicle of FIG. 1, in accordance with an embodiment of the present disclosure.

With the foregoing in mind, FIG. 2 is a block diagram of a transmission system 30 for a vehicle, such as the work vehicle 10, in accordance with an embodiment of the present disclosure. The transmission system 30 includes a transmission 16 that transmits power from the power input shaft 14 to the power output shaft 18. The engine 12 is coupled to the power input shaft 14 to provide power to rotate the power input shaft 14. In the illustrated embodiment, the transmission 16 is communicatively coupled to a transmission control system or controller 32, and includes a first clutch (e.g., an input clutch 34) and a second clutch (e.g., an output clutch 36). As illustrated, the input clutch 34 is coupled to the power input shaft 14 and the output clutch 36 is coupled to the power output shaft 18. The input clutch 34 is coupled to the output clutch 36 by an intermediate shaft 37, which may include an output shaft of the input clutch 34 and an input shaft of the output clutch 34. In some embodiments, the intermediate shaft 37 includes the output shaft of the input clutch 34 coupled to the input shaft of the output clutch 34 via gears in the transmission 16.

The input clutch 34 may control an input torque provided by the engine 12 via the power input shaft 14 to certain gears in the transmission 16. The output clutch 36 may control an output torque to other gears of the transmission 16, which are ultimately coupled to a load 38 (e.g., one or more drive wheels 20 of the work vehicle 10). Accordingly, the output clutch 36 may control acceleration of the work vehicle 10. The controller 32 may send signals to control the input clutch 34, the output clutch 36, other components (e.g., clutches) of the transmission 16, or a combination thereof. For example, the controller 32 may control an input clutch torque of the input clutch 34 and an output clutch torque of the output clutch 36. The controller 32 may control the input clutch 34 to engage gears of the transmission 16, such that the input torque provided by the engine 12 via the power input shaft 14 is transmitted through the transmission 16. The controller 32 may also control the output clutch 36, such that a direction and a rotation speed of the power output shaft 18 is controlled.

In the illustrated embodiment, the transmission system 30 includes an input speed sensor 40 that outputs a signal indicative of a speed of the power input shaft 14. For example, the input speed sensor 40 may couple to the power input shaft 14 and may determine a rotation speed of the power input shaft 14. In some embodiments, the input speed sensor 40 may couple to the engine 12 and configured to determine a speed of the engine 12. In some embodiments, an engine controller communicatively coupled to the engine 12 may output a signal indicative of the speed of the engine 12. In the illustrated embodiment, the controller 32 is communicatively coupled to the input speed sensor 40 and receives the signal indicative of the speed of the power input shaft 14. In some embodiments, the controller 32 may receive the signal indicative of the speed of the engine 12 from the engine controller or an engine speed sensor. In the illustrated embodiment, the transmission system 30 also includes an output speed sensor 42 that outputs a signal indicative of the speed of the power output shaft 18. For example, the output speed sensor 42 may couple to the power output shaft 18 and may determine a rotation speed of the power output shaft 18. In some embodiments, the output speed sensor 42 may couple to an intermediate portion of the transmission 16 and determine a speed of the intermediate portion (e.g., an intermediate speed within the transmission 16), wherein the intermediate portion is immediately downstream from the output clutch 36. In the illustrated embodiment, the controller 32 is communicatively coupled to the output speed sensor 42 and receives the signal indicative of the speed of the power output shaft 18. In the illustrated embodiment, the transmission system 30 further includes an intermediate speed sensor 44 that outputs a signal indicative of a speed of the intermediate shaft 37. For example, the intermediate speed sensor 44 may couple to and determine a rotation speed of the intermediate shaft 37, an output shaft of the input clutch 34, an input shaft of the output clutch 36, or a combination thereof. In the illustrated embodiment, the controller 32 is communicatively coupled to the intermediate speed sensor 44 and receives the signal indicative of the speed of the intermediate shaft 37.

The controller 32 is communicatively coupled to a user interface 50, which may include input devices (e.g., driver-actuated shift control(s), clutch pedal(s), etc.) and output devices (e.g., indicator(s) that provide vehicle information to the operator). Inputs into the user interface 50 may be communicated to the controller 32 for controlling the input clutch 34 and/or the output clutch 36. For example, the operator of the vehicle may shift between two gears by using the user interface 50 (e.g., using the driver-actuated shift controls), such that the input clutch 34 and/or the output clutch 36 may disengage and/or engage to facilitate shifting gears of the transmission 16. The controller 32 includes a processor 52 (e.g., a microprocessor) that may execute software, such as software for controlling the transmission system 30. Moreover, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors.

In the illustrated embodiments, the controller 32 is communicatively coupled to a memory device 54 that may store information such as controller programs, look up tables, configuration data, etc. In some embodiments, the memory device 54 may be internal to (i.e., a component of) the controller 32. The memory device 54 may include a volatile memory, such as random access memory (RAM), and/or a nonvolatile memory, such as read-only memory (ROM). The memory device 54 may store a variety of information and may be used for various purposes. For example, the memory device 54 may be a tangible, non-transitory, machine-readable medium that stores processor-executable instructions (e.g., firmware or software) and data for the processor 52 execute, such as instructions for controlling the transmission 16. Storage device(s) (e.g., nonvolatile storage) may also be communicatively coupled to the processor 52 and may include ROM, flash memory, a hard drive, or any other suitable optical, magnetic, or solid-state storage medium, or a combination thereof. The storage device(s) may store data, instructions (e.g., software or firmware for controlling the transmission 16, etc.), and any other suitable data.

Figure 3:
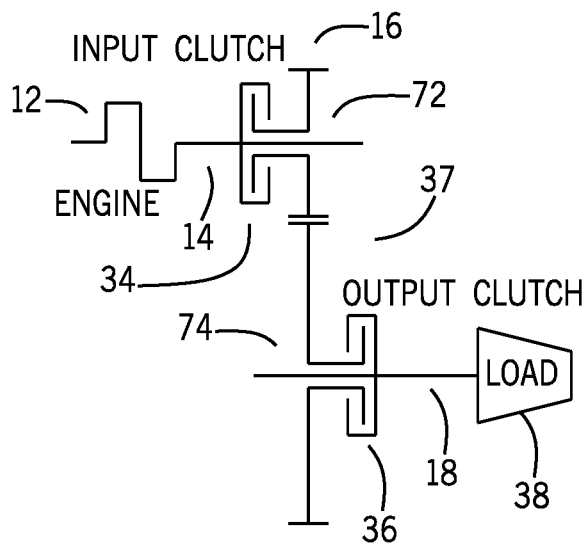
FIG. 3 is a schematic diagram of a transmission that may be used in the transmission system of FIG. 2, in accordance with an embodiment of the present disclosure.

FIG. 3 is a schematic diagram of a transmission 16, in accordance with an embodiment of the present disclosure. The transmission 16 includes the input clutch 34 and the output clutch 36. The engine 12 is coupled to the input clutch 34 by the power input shaft 14 and provides power to rotate the power input shaft 14. The input clutch 34 engages a first gear 72 that engages a second gear 74. The output clutch 36 engages the second gear 74 and is coupled to the power output shaft 18. The input clutch 34 and the output clutch are configured to transmit power from the power input shaft 14 to the power output shaft 18 via the first gear 72 and the second gear 74. In the illustrated embodiment, a gear ratio R between the first gear 72 and the second gear 74 (and, thus, the input clutch 34 and the output clutch 36) is 1:2 In alternative embodiments, the gear ratio R between a first gear and a second gear may be any suitable gear ratio, such as 1:1.5, 1:2.5, 1:3, and the like. In one embodiment, there may be no gears, and the input clutch 34 may be directly coupled to the output clutch 36 (e.g., via the intermediate shaft 37), such that the gear ratio may be 1:1. FIG. 3 is a simplified view of the transmission 16 and embodiments may include additional components between the input shaft 14 and the output shaft 18. For example, any combination of one or more gears, additional clutches, and the like, is contemplated between the input shaft 14 and the output shaft 18. The present disclosure also contemplates any gear ratio R between any two gears of the transmission 16.

As illustrated, a housing of the input clutch 34 is coupled to the engine 12 and a friction plate of the input clutch 34 is coupled to the first gear 72. Moreover, a housing of the output clutch 36 is coupled to the load 38 and a friction plate of the output clutch 36 is coupled to the second gear 74. When the input clutch 34 is engaged with the first gear 72 and the output clutch 36 is engaged with the second gear 74, power may be transmitted from the engine 12 to the load 38 via the power input shaft 14, the input clutch 34, the first gear 72, the second gear 74, the output clutch 36, and the power output shaft 18.

Figure 4:
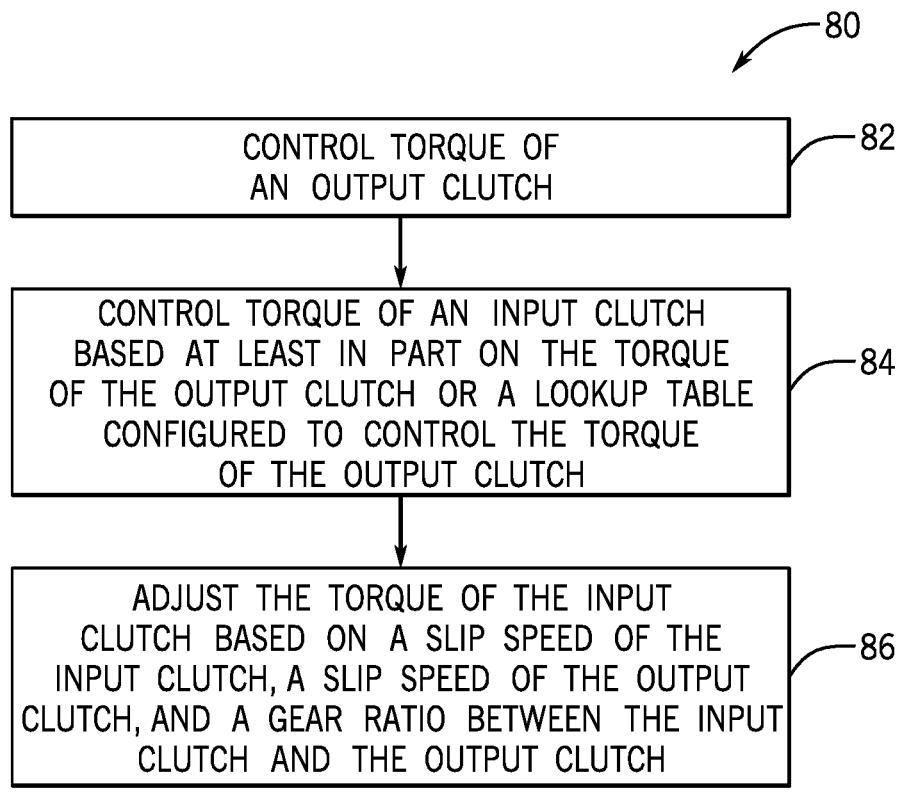
FIG. 4 is a flowchart of a method for controlling an input clutch and an output clutch of a transmission system, in accordance with an embodiment of the present disclosure.

FIG. 4 is a flowchart of a method 80 for controlling the input clutch 34 and the output clutch 36 of the transmission, in accordance with an embodiment of the present disclosure. The method 80 includes controlling (block 82) torque of the output clutch 36. In some embodiments, the controller 32 may control the output clutch torque based on a pressure to the output clutch 36 and a known relationship between the torque of and the pressure to the output clutch 36. The controller 32 may control the output clutch pressure based on a lookup table configured to control the output clutch torque of the output clutch 36. In some embodiments, the lookup table includes the output clutch pressure and a function of time of application of the output clutch 36. In some embodiments, the work vehicle 10 may include a clutch pedal that enables an operator of the work vehicle to control the output clutch pressure, and thus, engage the output clutch 36. As such, the output clutch pressure (and thus the output clutch torque) may be based on a position of the clutch pedal.

The method 80 also includes controlling (block 84) torque of the input clutch 34 based at least in part on torque of the output clutch 36 or the lookup table configured to control the output clutch torque. In some embodiments, the controller 32 may control the input clutch torque based on a pressure to the input clutch 34 and a known relationship between the torque of and the pressure to the input clutch 34 based on the torque of the output clutch 36. The controller 32 may control pressure to the input clutch 34 to control torque of the input clutch 34 based on the torque of the output clutch 36. For example, the controller 32 may control the input clutch pressure based on an input clutch torque provided as a result of the input clutch pressure, such that the input clutch torque is approximately equal to an output clutch torque (e.g., that is a result of the output clutch torque of block 82), adjusted for the gear ratio R between and relative torque capacity of the two clutches 34, 36. In some embodiments, the processor 52 may control the input clutch torque based on the output clutch pressure. The processor 52 may determine the output clutch pressure based on the lookup table of the output clutch pressure and the function of time of application of the output clutch 36. In some embodiments, the controller 32 may control the input clutch pressure such that the input clutch pressure is equal to the output clutch pressure (e.g., if the gear ratio R is 1:1 and the torque capacity of the input clutch and the output clutch are equal). In some embodiments, the controller 32 may control the input clutch pressure based on a gear ratio R between the input clutch 34 and the output clutch 36. For example, the input clutch pressure may be the gear ratio R multiplied by the output clutch pressure. Controlling the input clutch torque based on the output clutch may be referred to as an open loop or feed forward control technique.

The method 80 further includes adjusting (block 86) the input clutch torque based on a slip speed of the input clutch 34, a slip speed of the output clutch 36, and the gear ratio between the input clutch and the output clutch. The controller 32 may seek a condition where a slip speed of the input clutch 34 is R times a slip speed of the output clutch 36, where R is the gear ratio between the input clutch 34 and the output clutch 36. For example, if the slip speed of the input clutch 34 is greater than R times the slip speed of the output clutch 36, the controller 32 may increase the torque at the input clutch 34 (e.g., by increasing the input clutch pressure) to increase the speed of components between the two clutches 34, 36, thus decreasing the slip speed of the input clutch 34 and increasing the slip speed of the output clutch 36. Likewise, if the slip speed of the input clutch 34 is less than R times the slip speed of the output clutch 36, the controller 32 may decrease the torque at the input clutch 34 (e.g., by decreasing the input clutch pressure) to decrease the speed of components between the two clutches 34, 36, thus increasing the slip speed of the input clutch 34 and decreasing the slip speed of the output clutch 36. Because the power dissipated by a clutch is proportional to slip speed of the clutch multiplied by the torque at the clutch, power may be shared approximately equally among the two clutches 34, 36. (This ignores any power losses that occur between the two clutches 34, 36, which should typically be insignificant.)

In some circumstances, it may be desired to split the power dissipated by the two clutches 34, 36 unequally. In some circumstances, the output clutch 36 may have a larger or smaller surface area than the input clutch 34. For example, if the output clutch 36 has a larger surface area than the input clutch 34, it may be desirable to enable the output clutch 36 dissipate more power than the input clutch 34 (and vice versa). This may be accomplished by adjusting the target relative slip speed of the two clutches 34, 36. That is, the controller 32 may target a slip speed of the input clutch 34 that is R times the target split power dissipation between the two clutches 34, 36 multiplied by a slip speed of the output clutch 36. The resulting power dissipated by the two clutches 34, 36 will be split per the target split power dissipation.

For example, if the output clutch 36 has a surface area that is 1.5 times the surface area of the input clutch 34, it may be desirable to control the input clutch 34 such that the power dissipated by the output clutch 36 is 1.5 times the power dissipated by the input clutch 34. As such, it may be desired for the input clutch 34 to dissipate 40% and the output clutch 36 to dissipate 60% of the total power. This may be accomplished by adjusting the target relative slip of the two clutches 34, 36. For example, the controller 32 may target the slip speed of the input clutch 34 to ⅔ R times the slip speed of the output clutch 36. The resulting power dissipated by the input clutch 34 would be ⅔ of the power dissipated by the output clutch 36, resulting in 60% of the total power dissipated by the output clutch 36 and 40% by the input clutch 34.

During operation, the controller 32 may continually adjust the input clutch pressure of the input clutch 34 to realize a steady-state condition where the slip speed of the input clutch 34 and the slip speed of the output clutch 36 achieve the slip speed ratio. Controlling the input clutch pressure based on the slip speed of the input clutch 34 and the slip speed of the output clutch 36 may be referred to as a closed loop or feedback control technique.

Figure 5:
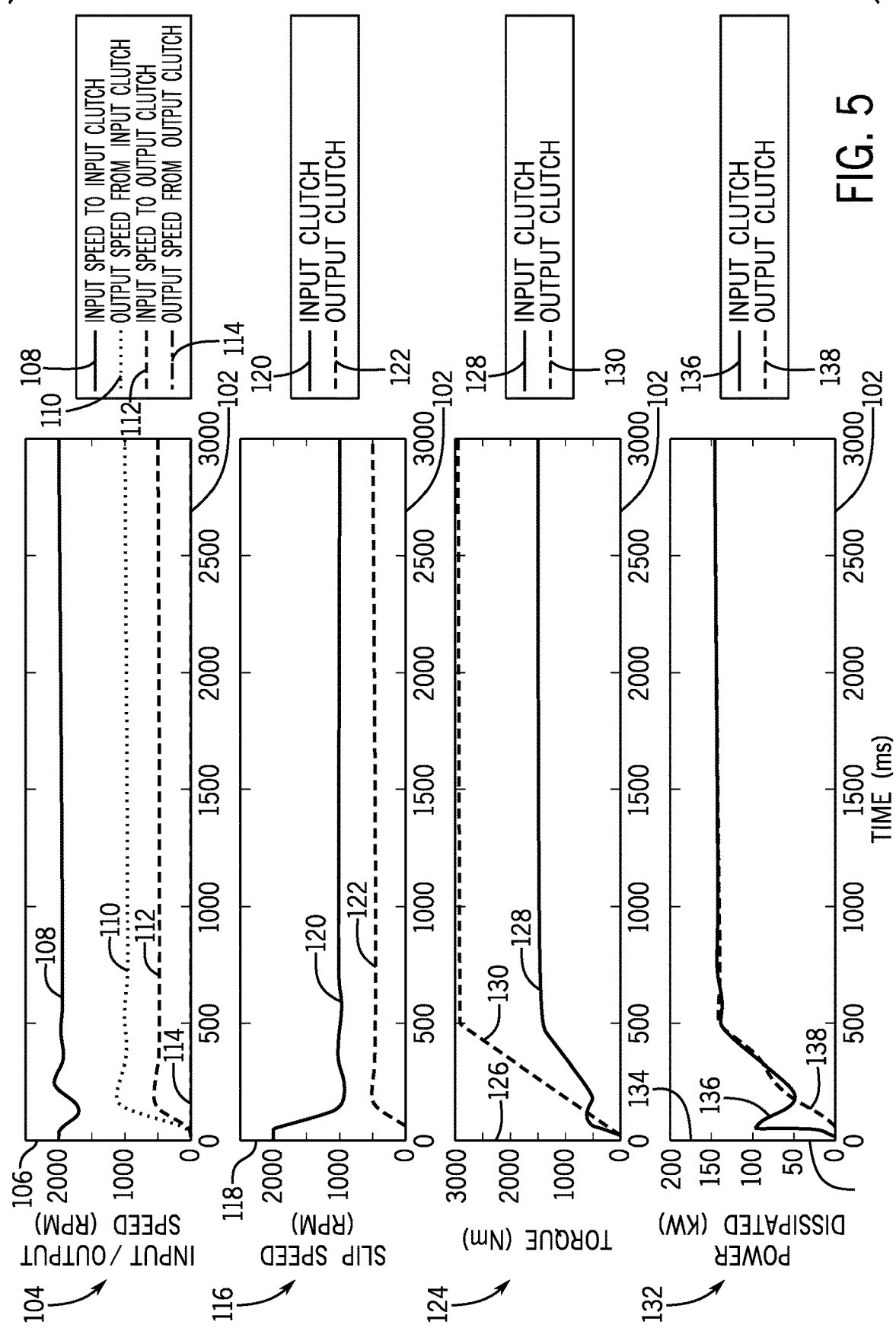
FIG. 5 is a set of graphs of parameters of an input clutch and an output clutch simulated in operation when a power output shaft is locked, in accordance with an embodiment of the present disclosure.

FIG. 5 is a set of graphs of parameters of the input clutch 34 and the output clutch 36 simulated in operation when the power output shaft is locked, in accordance with an embodiment of the present disclosure. The graphs illustrate the transmission of FIG. 3 and include the input clutch connected to a first gear and the output clutch connected to a second gear, such that the gear ratio R between the first gear and the second gear (and thus the gear ratio R between the input clutch and the output clutch) is 1:2 (or 2.0). The controller is configured to adjust the slip speed of the input clutch to equal R times the slip speed of the output clutch. As such, power dissipation is shared equally among the input clutch and the output clutch, such that the power dissipated by the output clutch is approximately 100 percent of the power dissipated by the input clutch. The output shaft is locked or stopped in order to simulate the input clutch and the output clutch absorbing 100 percent of the total power from the engine. The initial condition is zero torque transmitted by both clutches, and zero slip speed across the output clutch. The output clutch is then controlled to rise linearly for 500 milliseconds, then remain stable.

Each of the graphs includes a horizontal axis 102 representing time (in milliseconds). The first graph 104 includes a vertical axis 106 representing rotational speed (in revolutions per minute (RPM)) and includes curves representing input and output speeds to and from the input clutch and the output clutch. A first curve 108 represents the input speed to the input clutch, such as from the power input shaft. A second curve 110 represents the output speed from the input clutch, in which a reduction in speed from the input speed to the input clutch may be a result of the input clutch slipping. A third curve 112 represents the input speed to the output clutch, in which a reduction in speed from the output speed from the input clutch may be a result of components of the transmission between the input clutch and the output clutch (e.g., the gear ratio R). A fourth curve 114 represents the output speed from the output clutch, in which a reduction in speed from the input speed to the output clutch may be a result of the output clutch slipping. As mentioned above, the power output shaft is locked or stopped, such that it may not rotate. As a result, the output speed from the output clutch is zero throughout the duration of the first graph 104.

The second graph 116 includes a vertical axis 118 representing slip speed (in RPM) and includes curves representative of the slip speeds of the input clutch and the output clutch. A first curve 120 represents the slip speed of the input clutch and a second curve 122 represents the slip speed of the output clutch. Initially, only the input clutch slips (and thus dissipates power), while the output clutch does not slip. As the input clutch torque rises, the output clutch begins to slip. The controller controls the input clutch torque based on the output clutch torque as described in the open loop technique above. The controller then adjusts the input clutch torque to adjust the slip speed of the input clutch such that the slip speed of the input clutch is R times the slip speed of the output clutch as described in the closed loop technique above. As noted above, the gear ratio R between the input clutch and the output clutch is 1:2, or 2.0. Accordingly, the controller adjusts the slip speed of the input clutch such that the slip speed of the input clutch is R times the slip speed of the output clutch. As mentioned above, controlling the slip speed of the input clutch to equal R times the slip speed of the output clutch shares the power dissipation equally among the input clutch and the output clutch. As illustrated in the second graph 116, the slip speed of the input clutch, as represented by the first curve 120, and the slip speed of the output clutch, as represented by the second curve 122, eventually stabilize and maintain an approximately constant ratio (e.g., the gear ratio R) for the duration of the second graph 116. In particular, the slip speed of the input clutch stabilizes at approximately 1000 RPM and the slip speed of the output clutch stabilizes at approximately 500 RPM (i.e., the slip speed of the input clutch is approximately R times the slip speed of the output clutch.

The third graph 124 includes a vertical axis 126 representing torque (in Newton metres (Nm)) and includes curves representative of the torque applied by the input clutch 34 and the output clutch. A first curve 128 represents the torque applied by the input clutch, and a second curve 130 represents the torque applied by the output clutch. The controller controls the output clutch torque as shown on the third graph 124, and the controller controls the input clutch based on the controlled output clutch torque as described in the open loop technique above. The controller then adjusts the input clutch torque to adjust the slip speed of the input clutch such that the slip speed of the input clutch is R times the slip speed of the output clutch as described in the closed loop technique above. As illustrated in the third graph 124, the torque applied by the input clutch, as represented by the first curve 128, and the torque applied by the output clutch, as represented by the second curve 130, eventually stabilize and maintain an approximately constant ratio (e.g., the gear ratio R) for the duration of the third graph 124. In particular, the torque applied by the input clutch stabilizes at approximately 1450 Nm and the torque applied by the output clutch stabilizes at approximately 2900 Nm.

The fourth graph 132 includes a vertical axis 134 representing power (in kilowatts (kW)) and includes curves representative of the power dissipated or absorbed by the input clutch and the output clutch. A first curve 136 represents the power dissipated by the input clutch, and a second curve 138 represents the power dissipated by the output clutch. The input clutch is initially slipping, and so the input clutch begins to dissipate power as the input clutch begins to transmit torque. As the output clutch begins to slip, the output clutch begins to dissipate power as well. As the output clutch dissipates power, the controller controls the input clutch to apply an input clutch torque based on an output clutch torque as described in the open loop technique above. The controller then adjusts the input clutch torque to adjust the slip speed 120 of the input clutch such that the slip speed of the input clutch is R times the slip speed of the output clutch as described in the closed loop technique above. As illustrated in the fourth graph 132, the power dissipated by the input clutch and the power dissipated by the output clutch eventually stabilize and become approximately equal for the duration of the fourth graph 132. In particular, the power dissipated by the input clutch, as represented by the first curve 136, and the power dissipated 138 by the output clutch, as represented by the second curve 138, stabilizes at approximately 150 kW.

FIG. 6 is a set of graphs of parameters of the input clutch and the output clutch simulated in operation when the transmission is operated with a load, in accordance with an embodiment of the present disclosure. The graphs illustrate the transmission of FIG. 3 and include the input clutch drivingly connected to a first gear and the output clutch drivingly connected to a second gear, such that the gear ratio R between the input clutch and the output clutch is 1:2, or 2.0. The controller is configured to control the slip speed of the input clutch to equal R times the slip speed of the output clutch, such that the power dissipation is shared equally among the input clutch and the output clutch. The initial condition is zero torque transmitted by both clutches, and zero slip speed across the output clutch. The output clutch is then controlled to rise linearly for 500 milliseconds, then remain stable.

Each of the graphs includes identical axes to those of the axes of the graphs in FIG. 5, and curves identified in the same manner as those in FIG. 5. Because the graphs of FIG. 6 correspond to the transmission operating under load, the output speed of the output clutch, as represented by the fourth curve 114 in a first graph 152, no longer remains at zero, but instead increases speed as the output clutch is engaged. As with the second graph 116 in FIG. 5, a second graph 154 in FIG. 6 illustrates that the slip speed of the input clutch, as represented by the first curve 120, and the slip speed of the output clutch, as represented by the second curve 122, reach approximately ratio R within 500 milliseconds and then maintain an approximately constant ratio (e.g., the gear ratio R) for the remaining duration of the second graph 154. As with the third graph 124 in FIG. 5, a third graph 156 in FIG. 6 illustrates that the torque applied by the input clutch, as represented by the first curve 128, and the torque applied by the output clutch, as represented by the second curve 130, stabilize at about 500 milliseconds and maintain an approximately constant ratio (e.g., the gear ratio R) for the remaining duration of the third graph 156. And as with the fourth graph 132 if FIG. 5, a fourth graph 158 in FIG. 6 illustrates that the power dissipated by the input clutch, as represented by the first curve 136, and the power dissipated by the output clutch, as represented by the second curve 138, approach equality within 500 milliseconds and remain approximately equal for the remaining duration of the fourth graph 158.

FIG. 7 is a set of graphs of parameters of the input clutch and the output clutch simulated in operation when the transmission is operated with a load, in accordance with an embodiment of the present disclosure. In the illustrated embodiment, a gear ratio R between the first gear and the second gear (and, thus, the input clutch and the output clutch) is 1:2, or 2.0. The controller is configured to control the slip speed of the input clutch to equal ⅔ R times the slip speed of the output clutch, such that the input clutch dissipates 40 percent and the output clutch dissipates 60 percent of the total power dissipated (i.e., the power dissipated by the output clutch is approximately 1.5 times the power dissipated by the input clutch). The initial condition is zero torque transmitted by both clutches, and zero slip speed across the output clutch. The output clutch is then controlled to rise linearly for 500 milliseconds, then remain stable.

Each of the graphs includes identical axes to those of the axes of the graphs in FIG. 5, and curves identified in the same manner as those in FIG. 5. Because the graphs of FIG. 7 correspond to the transmission operating under load, the output speed of the output clutch, as represented by the fourth curve 114 in a first graph 172, does not remain at zero, but instead increases speed once the output clutch is engaged. A second graph 174 illustrates that the slip speed of the input clutch, as represented by the first curve 120, and the slip speed of the output clutch, as represented by the second curve 122, reach approximately ⅔ of ratio R within 500 milliseconds and then maintain an approximately constant ratio for the remaining duration of the second graph 174. As with the third graph 124 in FIG. 5, a third graph 176 in FIG. 7 illustrates that the torque applied by the input clutch, as represented by the first curve 128, and the torque applied by the output clutch, as represented by the second curve 130, stabilize at about 500 milliseconds and maintain an approximately constant ratio (e.g., the gear ratio R) for the remaining duration of the third graph 176. As illustrated in a fourth graph 178 of FIG. 7, the power dissipated by the input clutch, as represented by the first curve 136, and the power dissipated by the output clutch, as represented by the second curve 138, each approach within 500 milliseconds, and maintain for the remaining duration of fourth graph 178, the target ⅔ power dissipation relationship between the input clutch and the output clutch, where the input clutch dissipates 40 percent and the output clutch dissipates 60 percent of the total power dissipated (i.e., the output clutch dissipates 150 percent of the power dissipated by the input clutch).

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method of controlling an input clutch and an output clutch, wherein the input clutch is configured to couple to a power source, the output clutch is configured to couple to a load, and the input clutch is coupled to the output clutch via gears, the method comprising:
controlling torque of the input clutch based at least in part on a torque of the output clutch or a lookup table configured to control the torque of the output clutch; and
adjusting the torque of the input clutch based at least in part on a slip speed of the input clutch, a slip speed of the output clutch, and a gear ratio of the gears between the input clutch and the output clutch, wherein adjusting the torque of the input clutch comprises increasing the torque of the input clutch to decrease the slip speed of the input clutch to equal the gear ratio of the gears between the input clutch and the output clutch multiplied by the slip speed of the output clutch.

2. The method of claim 1, wherein controlling the torque of the input clutch comprises controlling a fluid pressure to the input clutch.

3. The method of claim 1, wherein the torque of the input clutch is controlled to equal the torque of the output clutch.

4. The method of claim 1, wherein the torque of the input clutch is controlled to equal the torque of the output clutch divided by the gear ratio of the gears between the input clutch and the output clutch.

5. The method of claim 1, wherein adjusting the torque of the input clutch comprises decreasing the torque of the input clutch to increase the slip speed of the input clutch to equal the gear ratio of the gears between the input clutch and the output clutch multiplied by the slip speed of the output clutch.

6. A system of a work vehicle, comprising:
a transmission comprising an input clutch and an output clutch, wherein the input clutch is configured to couple to a power source, the output clutch is configured to couple to a load, and the input clutch is coupled to the output clutch;
a controller communicatively coupled to the input clutch and to the output clutch, wherein the controller is configured to:
control torque of the input clutch based at least in part on a torque of the output clutch or a lookup table configured to control the torque of the output clutch; and
adjust the torque of the input clutch based at least in part on a slip speed of the input clutch, a slip speed of the output clutch, and a gear ratio of the gears between the input clutch and the output clutch, wherein adjusting the torque of the input clutch comprises increasing the torque of the input clutch to decrease the slip speed of the input clutch to equal the gear ratio of the gears between the input clutch and the output clutch multiplied by the slip speed of the output clutch.

7. The system of claim 6, wherein adjusting the torque of the input clutch is based at least in part on a target split power dissipation between the input clutch and the output clutch.

8. The system of claim 7, wherein adjusting the torque of the input clutch comprises increasing the torque of the input clutch to decrease the slip speed of the input clutch to equal the gear ratio of the gears between the input clutch and the output clutch multiplied by the target split power dissipation multiplied by the slip speed of the output clutch.

9. The system of claim 7, wherein adjusting the torque of the input clutch comprises decreasing the torque of the input clutch to increase the slip speed of the input clutch to equal the gear ratio of the gears between the input clutch and the output clutch multiplied by the target split power dissipation multiplied by the slip speed of the output clutch.

10. The system of claim 6, wherein adjusting the torque of the input clutch comprises decreasing the torque of the input clutch to increase the slip speed of the input clutch to equal the gear ratio of the gears between the input clutch and the output clutch multiplied by the slip speed of the output clutch.

11. A tangible, non-transitory, machine-readable medium, comprising machine-readable instructions to:
control torque of an input clutch based at least in part on a torque of an output clutch or a lookup table configured to control the torque of the output clutch, wherein the input clutch is configured to couple to a power source, the output clutch is configured to couple to a load, and the input clutch is coupled to the output clutch; and
adjust the torque of the input clutch based at least in part on a slip speed of the input clutch, a slip speed of the output clutch, and a gear ratio of the gears between the input clutch and the output clutch, wherein adjusting the torque of the input clutch comprises decreasing the torque of the input clutch to increase the slip speed of the input clutch to equal the gear ratio of the gears between the input clutch and the output clutch multiplied by the slip speed of the output clutch.

12. The machine-readable medium of claim 11, wherein adjusting the torque of the input clutch comprises increasing the torque of the input clutch to decrease the slip speed of the input clutch to equal the gear ratio of the gears between the input clutch and the output clutch multiplied by the slip speed of the output clutch.

13. The machine-readable medium of claim 11, wherein adjusting the torque of the input clutch is based at least in part on a target split power dissipation between the input clutch and the output clutch.

14. The machine-readable medium of claim 11, wherein controlling the torque of the input clutch comprises controlling a fluid pressure to the input clutch.

* * * * *